(12) United States Patent
Rueping

(10) Patent No.: US 7,891,556 B2
(45) Date of Patent: Feb. 22, 2011

(54) MEMORY ACCESS CONTROLLER AND METHOD FOR MEMORY ACCESS CONTROL

(75) Inventor: Stefan Rueping, Lengdorf (DE)

(73) Assignee: Infineon Technologies AG (DE)

( * ) Notice: Subject to any disclaimer, the term of this patent is extended or adjusted under 35 U.S.C. 154(b) by 420 days.

(21) Appl. No.: 11/625,981

(22) Filed: Jan. 23, 2007

(65) Prior Publication Data
US 2008/0028128 A1 Jan. 31, 2008

(30) Foreign Application Priority Data
Jul. 31, 2006 (DE) ........................ 10 2006 035 610

(51) Int. Cl.
*G06K 5/00* (2006.01)
(52) U.S. Cl. .................... 235/380; 235/382; 235/382.5; 711/163
(58) Field of Classification Search ................. 235/380, 235/382, 382.5; 711/163
See application file for complete search history.

(56) References Cited

U.S. PATENT DOCUMENTS

| 5,905,738 A | 5/1999 | Whetsel |
| 7,051,131 B1 | 5/2006 | Wiedenman et al. |
| 2007/0119924 A1* | 5/2007 | Register et al. ............. 235/380 |

FOREIGN PATENT DOCUMENTS

| DE | 195 32 640 C2 | 2/1997 |
| WO | WO-03/042834 A2 | 5/2003 |

* cited by examiner

*Primary Examiner*—Karl D Frech
(74) *Attorney, Agent, or Firm*—Dickstein Shapiro LLP

(57) ABSTRACT

A memory access controller has a first interface connectable to a memory and a second interface coupled with a first and a second executing unit. A critical software portion is stored in a first segment of the memory, and an uncritical software portion is stored in a second segment of the memory. The critical and uncritical software portions are executed by the first executing unit, and the critical software portion is additionally executed by the second executing unit. The memory access controller further has a first checker having an input for an access request received via the second interface and an output for a first check signal indicating whether the access request is directed to the first segment. Furthermore, the memory access controller has a second checker having an output for a second check signal indicating whether the second executing unit is active, as well as a control unit having inputs for the first and second check signals and an output for an alarm signal indicating that the access request is directed to the first segment and the second executing unit is not active.

12 Claims, 3 Drawing Sheets

MEMORY ACCESS CONTROLLER AND METHOD FOR MEMORY ACCESS CONTROL

CROSS-REFERENCE TO RELATED APPLICATION

This application claims priority from German Patent Application No. 10 2006 035 610.1, which was filed on Jul. 31, 2006, and is incorporated herein by reference in its entirety.

BACKGROUND

The present invention relates to a memory access controller and a method for memory access control that may be employed in processor systems and are particularly suitable for security systems.

Security systems, such as they are realized on chip cards, have to be protected against attacks. By introducing digital mechanisms for error detection, particularly error attacks are very efficiently prevented. Such mechanisms include error codes used in connection with memories or hardware redundancy realized in connection with the used logic.

These security measures, however, also have disadvantages. For example, the chip area and the energy consumption of such a system is not insignificantly increased.

BRIEF DESCRIPTION OF THE SEVERAL VIEWS OF THE DRAWING(S)

Embodiments of the present invention will be explained in more detail below with respect to the accompanying drawings, in which.

DESCRIPTION OF THE INVENTION

Figure 1:
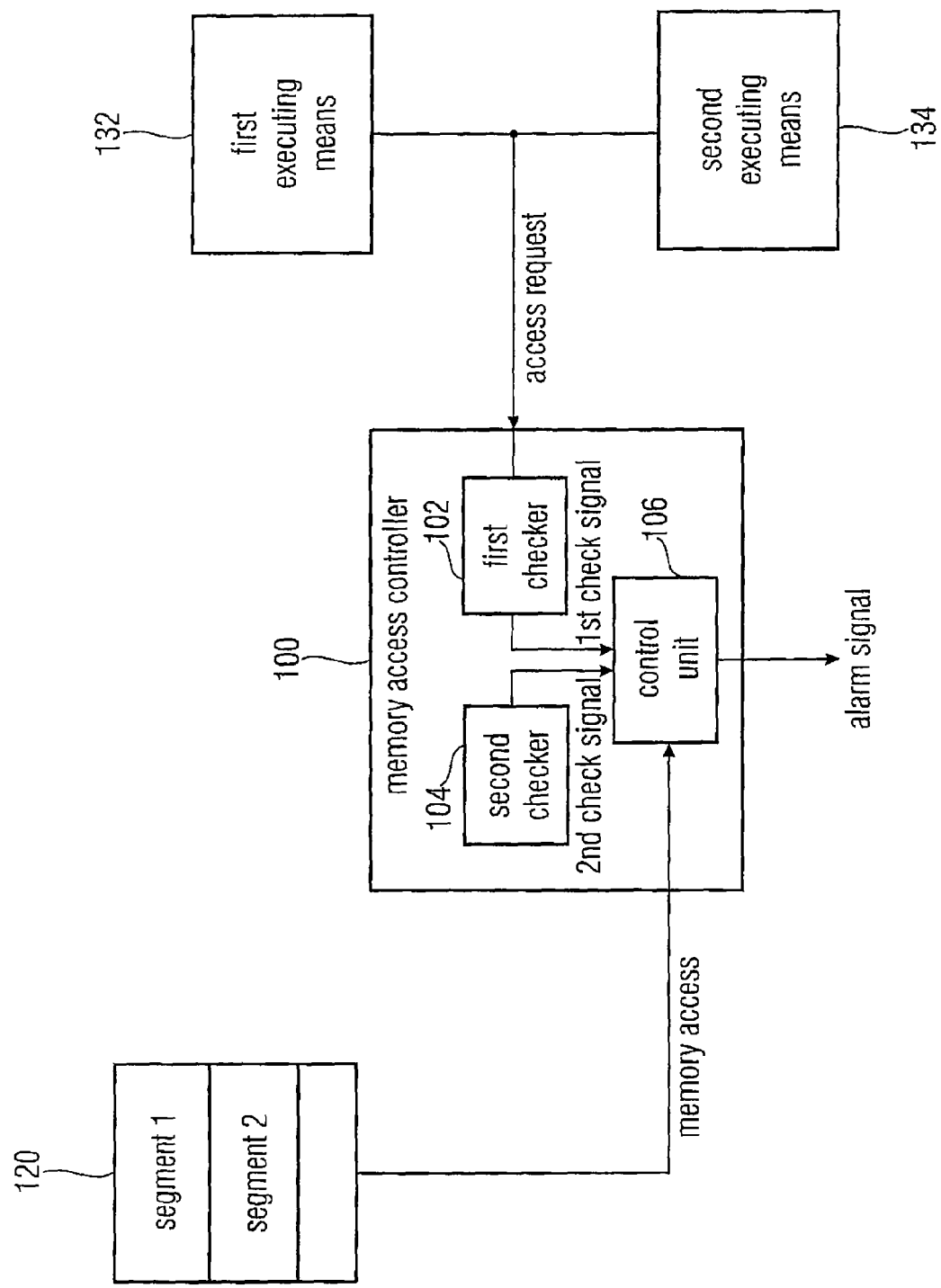
FIG. 1 shows a block circuit diagram of a system with a memory access controller according to an embodiment of the present invention.

It is an advantage of the present invention to provide a memory access controller and a method for memory access control allowing secure memory access control without requiring increased energy consumption.

According to an embodiment, the present invention provides a memory access controller comprising:

a first interface connected to a memory having stored a critical software portion in a first segment and an uncritical software portion in a second segment, wherein the critical and uncritical software portions are executed by a first executing unit, and the critical software portion is additionally executed by a second executing unit;

a second interface coupled with the first and the second executing unit;

a first checker having an input for an access request received via the second interface and an output for a first check signal indicating whether the access request is directed to the first segment;

a second checker having an output for a second check signal indicating whether the second executing unit is active; and a control unit having inputs for the first and second check signals and an output for an alarm signal indicating that the access request is directed to the first segment and the second executing unit is not active.

According to a further embodiment, the present invention provides a device for controlling access to a memory, wherein a critical software portion is stored in a first segment of the memory, and an uncritical software portion is stored in a second segment of the memory, and wherein the critical and uncritical software portions are executed by a first executing unit, and the critical software portion is additionally executed by a second executing unit, comprising:

receiver that receives an access request to the memory; first checker that checks whether the second executing unit is active;

second checker that checks whether the access request is directed to the first segment; and indicator that indicates that the access request is directed to the first segment and the second executing unit is not active.

According to a further embodiment, the present invention provides a method for controlling access to a memory, wherein a critical software portion is stored in a first segment of the memory and an uncritical software portion is stored in a second segment of the memory, and wherein the critical and uncritical software portions are executed by a first executing unit, and the critical software portion is additionally executed by a second executing unit, comprising:

receiving an access request to the memory;

checking whether the access request is directed to the first segment;

checking whether the second executing unit is active; and indicating that the access request is directed to the first segment and the second executing unit is not active.

In the following description of the embodiments of the present invention, equal or similar reference numerals are used for the elements illustrated in the various drawings and operating similarly, wherein repeated description of these elements is omitted.

The present invention is based on the idea to turn on special security mechanism only in the case of security-critical operations. This allows to save energy. The inventive approach takes into account risks that may be triggered by wrong jumping of an executed software. It is necessary to rule out that, by a software jump during the execution of uncritical software operations, there arises the possibility to execute security-critical code sequences or to obtain access to security-critical data without the security mechanisms being activated. If this occurred, an attack on the system could be successful and the system could thus be insecure. According to the present invention, a hardware firewall is implemented between uncritical parts of the software and security-critical parts of the software. This idea allows to operate a system either in a low energy mode or a high security mode without the system having a security gap.

In systems with doubled hardware parts, it is thus possible to turn off the doubled hardware parts during the low energy mode and to activate them during the high security mode without making the system insecure. In particular, this idea may be realized with little effect on the software.

In embodiments of the invention, critical software portions are understood to be portions that contain security-relevant parts and thus have to be executed by two executing unit in parallel.

FIG. 1 shows a system with a memory access controller 100 according to an embodiment of the present invention. The memory access controller 100 comprises a first checker 102 and a second checker 104, a control unit 106. The memory access controller 100 is coupled with a memory 120 as well as first executing means 132 and second executing means 134.

According to the embodiment shown in FIG. 1, the memory access controller 100 is connected to the first executing means 132 and the second executing means 134 to receive an access request from them. The access request may, for example, contain a virtual memory address. Furthermore, the memory access controller 100 is connected to the memory 120 to perform a memory access. The memory access may include a physical address of the memory 120. The memory access controller 100 is designed to convert the access request of the executing means 132, 134 to the memory access to the memory. If the access request is a virtual address, the memory access controller is designed to receive the virtual address and to output a physical address corresponding to the virtual address.

The system shown in FIG. 1 is designed to perform software operations. The underlying software may be stored in the memory 120. The software may comprise security-critical portions and security-uncritical portions. Critical software portions are, for example, those processing security-critical data or allowing access to protected software or hardware areas. When executing security-critical software portions, both the first executing means 132 and the second executing means 134 are active. This means that security-critical software portions are executed on doubled hardware parts. This results in hardware redundancy that very effectively prevents error attacks. In security-uncritical software portions, this hardware redundancy is not required. Thus security-uncritical software portions may be executed either only on the first executing means 132 or only on the second executing means 134. It is also possible to execute security-uncritical software portions on both executing means 132, 134. However, security-critical software portions are always executed on both executing means 132, 134. The memory 120 is divided into segments. FIG. 1 exemplarily shows a segment 1 and a segment 2. According to this embodiment, a security-critical portion of the software is stored in segment 1, and a security-uncritical portion of the software is stored in segment 2. Known segmenting mechanisms may be used for segmenting the memory 120. Critical software portions may be stored in any segments of the memory 120.

The memory access controller 100 is designed to receive the access request via a second interface. Furthermore, the first checker 102 comprises an input for receiving the access request. The first checker 102 is designed to check which segment of the memory 120 the access request is directed to. Via an output, the first checker 102 may output a first check signal indicating which segment of the memory 120 the access request is directed to. According to this embodiment, the first checker 102 may particularly indicate whether the access request is directed to the segment of the memory 120 in which the security-critical portion of the software is stored. If the access request is directed to the segment 1 of the memory 120, in which the security-critical software portion is stored, both executing means 132, 134 should already be activated.

The second checker 104 is designed to check whether both executing means 132, 134 are active. This may be done, for example, by reading out a check bit indicating whether the executing means 132, 134 are active. For example, the check bit may be set whenever both executing means 132, 134 are active. The second checker comprises an output for outputting a second check signal. The second check signal may indicate whether both executing means 132, 134 are active.

The control unit 106 is designed to receive the first check signal and the second check signal. For this purpose, the control unit 106 comprises corresponding inputs for the first and second check signals. Furthermore, the control unit 106 comprises an output for outputting an alarm signal. The alarm signal indicates that the access request is directed to the segment 1 of the memory 120, in which the security-critical software portion is stored, and that not both the first executing means 132 and the second executing means 134 are active. The alarm signal may be output by the system shown in FIG. 1. Alternatively, the alarm signal may also be used to block the access request that triggered the alarm signal or to put the system into a secure mode. If, however, the access request is directed to an uncritical software portion and only one of the executing means 132, 134 is active, the alarm is not triggered.

For example, the system shown in FIG. 1 may be a processor system, as it is realized on chip cards. In this case, the memory access controller may be a memory management unit, the memory 120 may be a ROM, a RAM memory or an NVM memory (NVM=non volatile memory), and the executing means 132, 134 may be doubled parts of a CPU. The memory access controller 100 may be connected to the memory 120 and the executing means 132, 134 via address busses.

The present invention offers a solution that is of particularly high value for low power systems, such as contactless chip cards. Especially advantageous is the low power consumption of the inventive approach for such a security system. In particular, the inventive approach allows to reduce the increased energy consumption that up to now had to be accepted because of security mechanisms.

Figure 2:
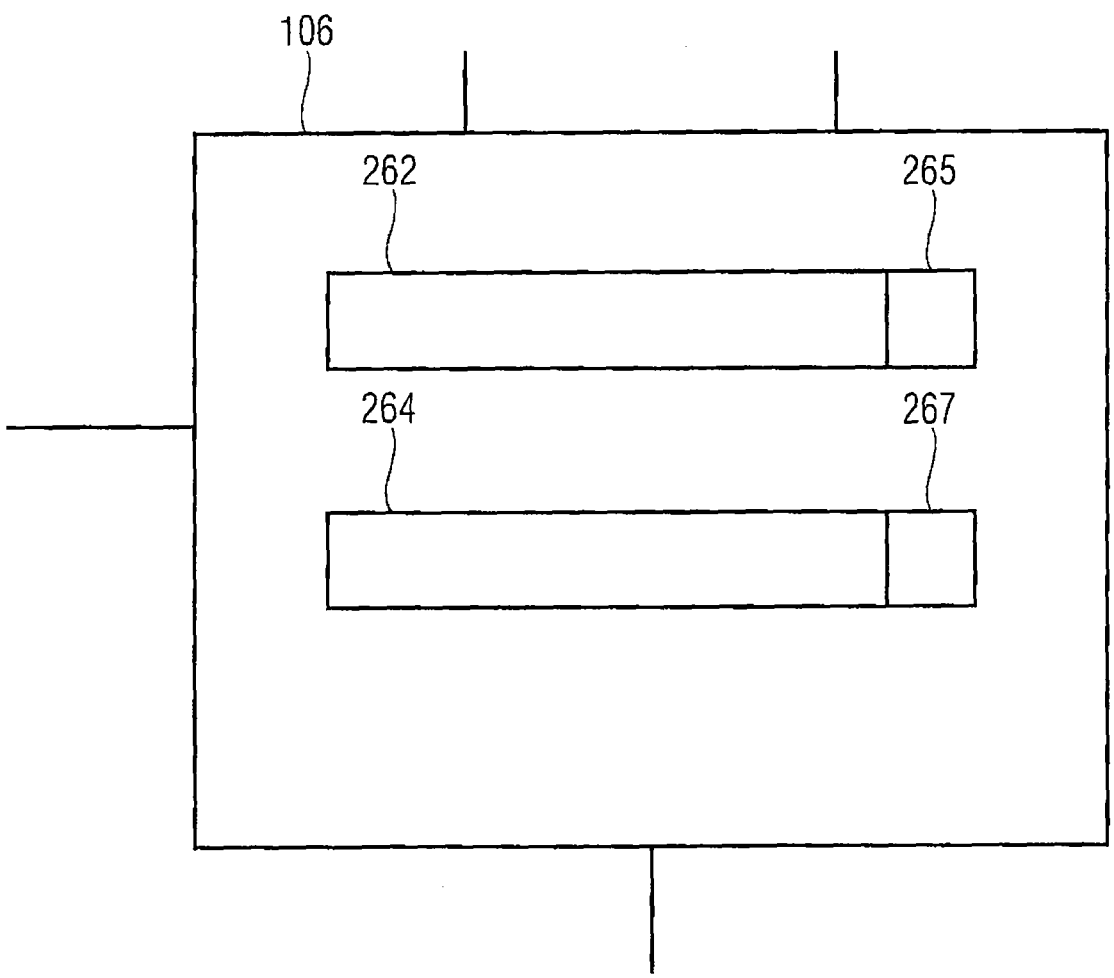
FIG. 2 is a schematic representation of a control unit according to an embodiment of the present invention.

FIG. 2 shows a schematic representation of a control unit 106 according to an embodiment of the present invention. The control unit 106 comprises descriptors 262, 264. The descriptors 262, 264 may be register sets, such as they are used in conventional memory management units. Typically, one descriptor is associated with each segment of the memory 120. According to this embodiment, the descriptor 262 is associated with segment 1, and the descriptor 264 is associated with segment 2. For example, the descriptors 262, 264 may contain information on the physical base address, the length and the access rights of the associated segment. Thus, a conversion of the access request containing a virtual address to the memory access containing a physical address is possible with the help of the descriptors 262, 264.

According to the inventive approach, the descriptors 262, 264 have memory locations for high security mode bits 265, 267. If such a high security mode bit 265, 267 is set, a memory access to the associated segment may only be done when both executing means 132, 134 are active.

According to an alternative embodiment, the high security mode bits 265, 267 may be used to activate the executing means 132, 134. This could, for example, be required when there is an access request to a segment of the memory 120 in which security-critical software portions are stored and currently only one of the executing means 132, 134 is active.

Figure 3:
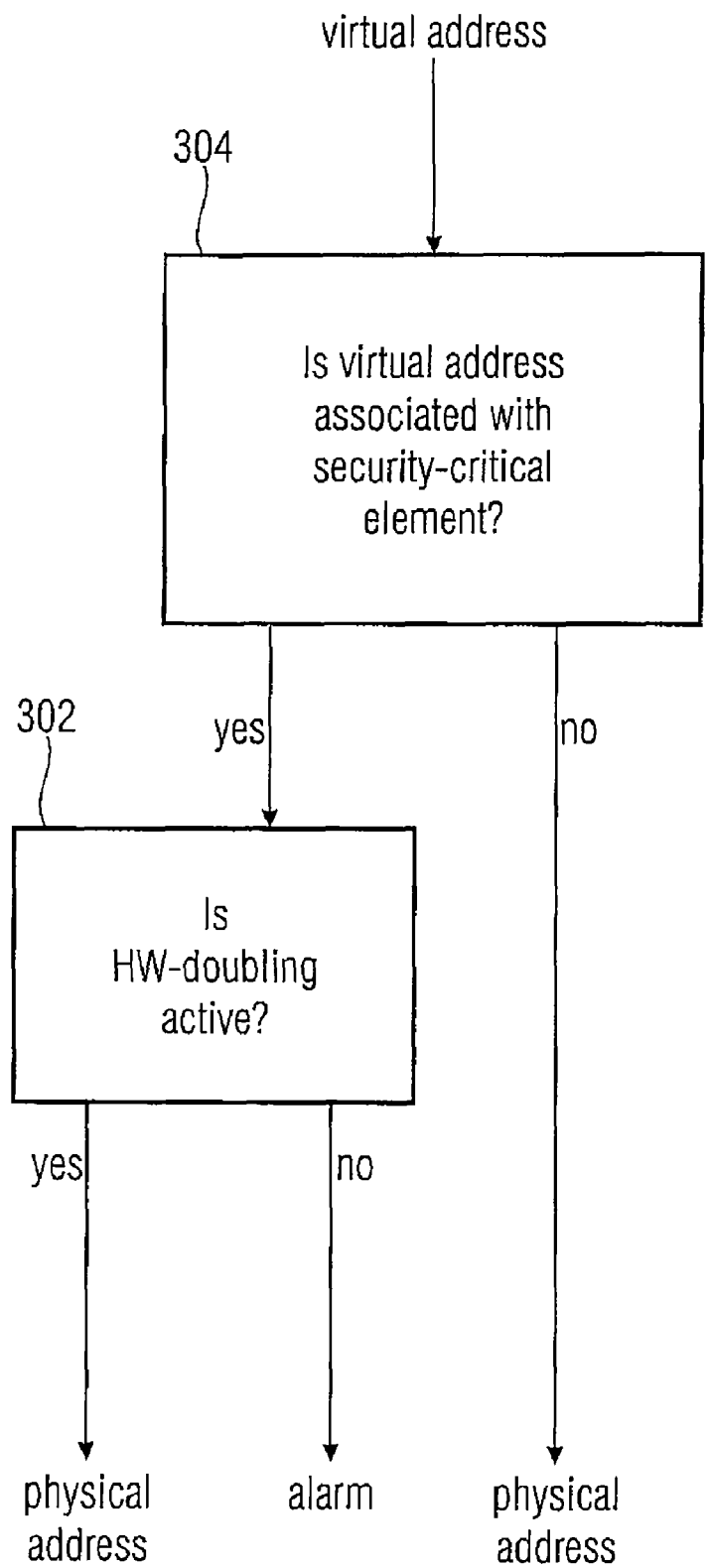
FIG. 3 is a flow diagram of a method for memory access control according to an embodiment of the present invention.

FIG. 3 shows a flow control of a method for memory access control according to an embodiment of the present invention. According to this embodiment, a virtual address is output to the memory access controller by a processor, for example. In a first step 302, the memory access controller checks whether the received virtual address is associated with a security-critical segment of the memory. If this is not the case, the associated physical address may be output directly and an access to the memory may be started. If, however, the virtual address is an address associated with a security-critical segment, a further step 304 checks whether the hardware doubling is active. If the hardware doubling is active, the physical address corresponding to the virtual address may again be output and the access to the memory may be started. However, if the hardware doubling is not active, an alarm is triggered.

The core idea of the present invention is thus to give an identification to the segments mapping the physical memory to the virtual memory in the memory management unit (MMU) of the system, with which an access without activated security mechanisms is allowed or not allowed. Thus, if an attack on the system results in a situation that, during turned off security mechanisms, i.e. turned off hardware doubling, a code or data area stored in the memory and identified as security-relevant is accessed by an attack, the system automatically generates a security alarm.

The hardware doubling may be executed by implementing two identical processors. Alternatively, there may also be realized only a single processor in which individual logic portions are implemented twice and may be activated correspondingly to a required security level of the software to be executed. A distinction between the high security mode, in which the hardware redundancy is active, and the low energy mode, in which the doubling is not active, may be done by the software to be executed, for example a customer software.

Depending on the circumstances, the inventive memory access method may be implemented in hardware or in software. The implementation may be done on a digital storage medium, particularly a floppy disk or CD with control signals that may be read out electronically, which may cooperate with a programmable computer system so that the corresponding method is executed. In general, the invention thus also consists in a computer program product with a program code stored on a machine-readable carrier for performing the inventive method when the computer program products runs on a computer. In other words, the invention may thus be realized as a computer program with a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A memory access controller, comprising:
    a first interface connectable to a memory having stored therein a critical software portion in a first segment and an uncritical software portion in a second segment, wherein the critical and uncritical software portions are executed by a first executing unit, and the critical software portion is additionally executed by a second executing unit;
    a second interface connectable with the first and second executing unit;
    a first checker with an input for an access request received via the second interface and an output for a first check signal indicating whether the access request is directed to the first segment;
    a second checker with an output for a second check signal indicating whether the second executing unit is active; and
    a control unit with inputs for the first and second check signals and an output for an alarm signal indicating that the access request is directed to the first segment and the second executing unit is not active.

2. The memory access controller of claim 1, wherein the control unit comprises a further output for a memory access signal, with which an access to the memory is performed.

3. The memory access controller of claim 1, wherein the control unit comprises a first register optionally associated with the first segment, and a second register optionally associated with the second segment, and wherein the first register comprises a first security bit indicating whether the first segment comprises a critical software portion, and the second register comprises a second security bit indicating whether the second segment comprises a critical software portion.

4. A system comprising:
    a memory with a first segment, in which a critical software portion is stored, and a second segment, in which an uncritical software portion is stored;
    a first executing unit on which the critical and uncritical software portions are executed;
    a second executing unit on which the critical software portion is additionally executed;
    a memory access controller comprising a first interface connected to the memory; a second interface coupled with the first and second executing unit; a first checker with an input for an access request received via the second interface and an output for a first check signal indicating whether the access request is directed to the first segment; a second checker with an output for a second check signal indicating whether the second executing unit is active; and a control unit with inputs for the first and second check signals and an output for an alarm signal indicating that the access request is directed to the first segment and the second executing unit is not active.

5. The system of claim 4, wherein the uncritical software portion is also executed on the second executing unit.

6. The system of claim 4, which is realized on a chip card.

7. A device for controlling access to a memory, wherein a critical software portion is stored in a first segment of the memory, and an uncritical software portion is stored in a second segment of the memory, and wherein the critical and uncritical software portions are executed by a first executing unit, and the critical software portion is additionally executed by a second executing unit, comprising:
    means for receiving an access request to the memory;
    first means for checking whether the second executing unit is active;
    second means for checking whether the access request is directed to the first segment; and
    means for indicating that the access request is directed to the first segment and the second executing unit is not active.

8. The device of claim 7, further comprising an access means for accessing the first segment of the memory when the access request is directed to the first segment and the second executing unit is active.

9. The device of claim 7, further comprising an access means for triggering an alarm signal or for placing a system in which the device is located into a secure mode.

10. The device of claim 9, wherein the alarm signal blocks the access request.

11. A method for controlling access to a memory, wherein a critical software portion is stored in a first segment of the memory and an uncritical software portion is stored in a second segment of the memory, and wherein the critical and uncritical software portions are executed by a first executing unit, and the critical software portion is additionally executed by a second executing unit, comprising:
    receiving an access request to the memory;

checking whether the access request is directed to the first segment;

checking whether the second executing unit is active; and indicating that the access request is directed to the first segment and the second executing unit is not active.

12. A non-transitory digital storage medium having stored thereon a computer program with program code for performing a method for controlling access to a memory, when the computer program runs on a computer, wherein a critical software portion is stored in a first segment of the memory and an uncritical software portion is stored in a second segment of the memory, and wherein the critical and uncritical software portions are executed by a first executing unit, and the critical software portion is additionally executed by a second executing unit, comprising receiving an access request to the memory; checking whether the access request is directed to the first segment; checking whether the second executing unit is active; and indicating that the access request is directed to the first segment and the second executing unit is not active.

* * * * *